(12) United States Patent
Westerweck et al.

(10) Patent No.: US 7,825,985 B2
(45) Date of Patent: Nov. 2, 2010

(54) CAMERA MODULE BACK-FOCAL LENGTH ADJUSTMENT METHOD AND ULTRA COMPACT COMPONENTS PACKAGING

(75) Inventors: Lothar Westerweck, San Jose, CA (US); Albert Chua, San Jose, CA (US); Abhijit Limaye, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 616 days.

(21) Appl. No.: 11/980,021

(22) Filed: Oct. 29, 2007

(65) Prior Publication Data

US 2009/0021624 A1    Jan. 22, 2009

Related U.S. Application Data

(60) Provisional application No. 60/961,312, filed on Jul. 19, 2007.

(51) Int. Cl.
*H04N 5/225* (2006.01)
*G02B 13/16* (2006.01)

(52) U.S. Cl. .................. 348/374; 348/335; 396/452

(58) Field of Classification Search ............... 348/374, 348/335
See application file for complete search history.

(56) References Cited

U.S. PATENT DOCUMENTS

| | | | |
|---|---|---|---|
| 2,279,372 A | 4/1942 | Herzberger | 88/57 |
| 3,087,384 A | 4/1963 | Baur et al. | 88/57 |
| 3,599,377 A | 8/1971 | Dartnell | 51/284 |
| 3,609,270 A | 9/1971 | Jorgensen et al. | 200/67 |
| 4,257,086 A | 3/1981 | Gulliksen | |
| 4,879,592 A | 11/1989 | Ernest | 358/42 |
| 5,016,993 A | 5/1991 | Akitake | 350/429 |
| 5,095,204 A | 3/1992 | Novini | 250/223 B |
| 5,177,638 A | 1/1993 | Emura et al. | 359/704 |
| 5,196,963 A | 3/1993 | Sato et al. | 359/699 |
| 5,272,567 A | 12/1993 | Inoue | 359/696 |
| 5,546,147 A | 8/1996 | Baxter et al. | 354/187 |
| 5,689,746 A | 11/1997 | Akada et al. | |
| 5,754,210 A | 5/1998 | Haneda et al. | 347/116 |
| 5,805,362 A | 9/1998 | Hayes | 359/819 |
| 5,835,208 A | 11/1998 | Hollmann et al. | 356/124 |
| 5,926,965 A | 7/1999 | Shijo et al. | 33/390 |

(Continued)

FOREIGN PATENT DOCUMENTS

CN     1324012 A    11/2001

(Continued)

OTHER PUBLICATIONS

Office Action regarding Chinese Patent Application No. 200680041383.0, Application Date: Sep. 5, 2006, date of Office Action: Dec. 18, 2009, 8 pages.

(Continued)

*Primary Examiner*—Tuan Ho
*Assistant Examiner*—Hung H Lam
(74) *Attorney, Agent, or Firm*—Haverstock & Owens LLP

(57) ABSTRACT

The present invention relates to methods of manufacturing ultra-compact camera modules, adjusting them, post production, to precise focal point settings, and sealing the precisely aligned assembly to maintain the focal point. Also, the invention specifically relates to ultra-compact camera module apparatuses.

11 Claims, 8 Drawing Sheets

U.S. PATENT DOCUMENTS

| | | | |
|---|---|---|---|
| 5,954,192 A | 9/1999 | Iitsuka | 200/336 |
| 5,966,248 A | 10/1999 | Kurokawa et al. | 359/697 |
| 6,091,902 A | 7/2000 | Komatsuzaki et al. | 396/60 |
| 6,292,306 B1 | 9/2001 | Betensky | 359/663 |
| 6,330,400 B1 | 12/2001 | Bittner et al. | 396/72 |
| 6,417,601 B1 | 7/2002 | Kim | 310/333 |
| 6,530,703 B2 | 3/2003 | Nakano et al. | |
| 6,597,516 B2 | 7/2003 | Saitoh et al. | 359/694 |
| 6,760,167 B2 | 7/2004 | Meehan et al. | 359/822 |
| 6,762,888 B1 | 7/2004 | Oshima | 359/696 |
| 6,792,246 B2 | 9/2004 | Takeda et al. | 455/41.1 |
| 6,805,499 B2 | 10/2004 | Westerweck et al. | 396/448 |
| 6,869,233 B2 | 3/2005 | Westerweck et al. | 396/460 |
| 6,940,209 B2 | 9/2005 | Henderson | 310/323.02 |
| 7,010,224 B2 | 3/2006 | Nomura | 396/85 |
| 7,088,525 B2 | 8/2006 | Finizio et al. | 359/703 |
| 7,156,564 B2 | 1/2007 | Watanabe et al. | |
| 7,193,793 B2 | 3/2007 | Murakami et al. | 359/791 |
| 7,301,712 B2 | 11/2007 | Kamo | 359/785 |
| 7,330,648 B2 | 2/2008 | Morinaga et al. | 396/144 |
| 7,379,112 B1 * | 5/2008 | Raad | 348/340 |
| 7,394,602 B2 | 7/2008 | Chen et al. | 359/785 |
| 7,400,454 B2 | 7/2008 | Kubota et al. | 359/689 |
| 7,420,609 B2 | 9/2008 | Yamaguchi et al. | 348/335 |
| 7,605,991 B2 * | 10/2009 | Chiang | 359/811 |
| 7,675,565 B2 * | 3/2010 | Cheng | 348/357 |
| 2002/0018140 A1 | 2/2002 | Suemoto et al. | 348/358 |
| 2002/0102946 A1 | 8/2002 | SanGiovanni | 455/90 |
| 2002/0136556 A1 | 9/2002 | Nomura et al. | |
| 2003/0174419 A1 | 9/2003 | Kindler et al. | 359/819 |
| 2004/0042780 A1 | 3/2004 | Kindaichi et al. | |
| 2004/0042785 A1 | 3/2004 | Watanabe et al. | |
| 2004/0042786 A1 | 3/2004 | Watanabe et al. | |
| 2004/0056970 A1 | 3/2004 | Westerweck et al. | 348/240.3 |
| 2004/0056974 A1 | 3/2004 | Kitajima et al. | |
| 2004/0203532 A1 | 10/2004 | Mizuta | 455/90.3 |
| 2004/0258405 A1 | 12/2004 | Shiratori et al. | 396/458 |
| 2005/0063698 A1 | 3/2005 | Usuda et al. | |
| 2005/0157195 A1 | 7/2005 | Ohashi et al. | |
| 2005/0248684 A1 * | 11/2005 | Machida | 348/373 |
| 2005/0264670 A1 | 12/2005 | Yamaguchi et al. | 348/335 |
| 2006/0049720 A1 | 3/2006 | Henderson et al. | 310/328 |
| 2006/0056389 A1 | 3/2006 | Monk et al. | 370/352 |
| 2006/0083503 A1 | 4/2006 | Fukai | |
| 2006/0113867 A1 | 6/2006 | Sakatani et al. | 310/323.17 |
| 2006/0124746 A1 | 6/2006 | Kim et al. | |
| 2006/0192885 A1 | 8/2006 | Calvet et al. | 348/345 |
| 2006/0209205 A1 * | 9/2006 | Tsai | 348/373 |
| 2006/0291061 A1 | 12/2006 | Iyama et al. | 359/614 |
| 2007/0053672 A1 | 3/2007 | Westerweck et al. | 396/79 |
| 2007/0074966 A1 | 4/2007 | Yamamoto et al. | 200/547 |
| 2007/0077051 A1 | 4/2007 | Toor et al. | 396/144 |
| 2007/0077052 A1 | 4/2007 | Chang | 396/144 |
| 2007/0086777 A1 | 4/2007 | Fujita | 396/452 |
| 2007/0108847 A1 * | 5/2007 | Chang | 310/12 |
| 2007/0122146 A1 | 5/2007 | Ryu | 396/529 |
| 2007/0201866 A1 | 8/2007 | Kihara | |
| 2007/0280667 A1 * | 12/2007 | Shin | 396/133 |

FOREIGN PATENT DOCUMENTS

| | | |
|---|---|---|
| EP | 1148406 A2 | 10/2001 |
| EP | 1148406 A3 | 6/2002 |
| EP | 1357726 A1 | 10/2003 |
| GB | 1 378515 | 12/1974 |
| GB | 2315186 A | 1/1998 |
| GB | 2387063 A | 10/2003 |
| JP | 402123335 A | 5/1990 |
| JP | 11-72678 | 3/1999 |
| JP | 2002-286987 | 10/2002 |

OTHER PUBLICATIONS

Non-Final Office Action dated Jun. 11, 2009, U.S. Appl. No. 12/287,469, filed Oct. 8, 2008, Westerweck, Lothar.

"High Precision Optical Assembly Starts Here," (4 pgs) 1996, Opto-Alignment Technology, Inc.

* cited by examiner

CAMERA MODULE BACK-FOCAL LENGTH ADJUSTMENT METHOD AND ULTRA COMPACT COMPONENTS PACKAGING

RELATED APPLICATIONS

This patent application claims priority under 35 U.S.C. §119 (e) of the U.S. Provisional Patent Application Ser. No. 60/961,312, filed Jul. 19, 2007, and entitled, "CAMERA MODULE BACK-FOCAL LENGTH ADJUSTMENT METHOD AND ULTRA COMPACT COMPONENTS PACKAGING". The Provisional Patent Application Ser. No. 60/961,312, filed Jul. 19, 2007, and entitled, "CAMERA MODULE BACK-FOCAL LENGTH ADJUSTMENT METHOD AND ULTRA COMPACT COMPONENTS PACKAGING" is also hereby incorporated by reference in its entirety.

FIELD OF THE INVENTION

The present invention relates generally to the field of miniature photography modules. More specifically, the present invention relates to methods of manufacturing ultra-compact camera modules, adjusting them post production to precise focal point settings and sealing the precisely aligned module to maintain the focal point. Also, the invention specifically relates to ultra-compact camera module apparatuses.

BACKGROUND OF THE INVENTION

Designers of camera modules are perpetually faced with the challenge of packaging components inside a small envelope. Recently, the camera manufacturing industry has seen a rapid decrease in the size of component envelopes. One reason for the rapid pace of ever-shrinking camera technology has been the integration of camera technology and miniature consumer electronic products, such as cellular telephones with a digital camera incorporated therein. Furthermore, there is an ever-increasing trend to install miniature cameras in a wide variety of other consumer products not ordinarily associated with typical camera applications.

Some of the parts used in a miniature camera include: a lens package containing the lenses needed for the given application, an imaging device and a barrel housing to house the lens package and to allow optical communication between the lens package to the imaging device. Further, it is desirable for the manufacturers of the miniature cameras to be able to mass produce camera modules. Often times, however, mass production results in small differences in size of the module components and size differences from the manufacturing process. Therefore, post assembly focusing is needed to adjust the focal point (back focal length) of mass-produced lens packages to account for tiny differences in the manufactured part and based on the differences needed in given specific applications. Also, it is desirable for the camera module manufacturers to be able to achieve these goals while maintaining high-quality standards, reliability and commercial feasibility.

Various solutions have been proposed to solve the problems associated with manufacturing ultra-compact camera modules with the ability to focus assembly parts after they are assembled. One approach used to decrease the size of the module utilizes traditional wire bonding technology and integrates the imaging device onto a substrate which contains other necessary electronic components. Examples of this substrate may include ceramic, BT, FR4, etc. Those having ordinary skill in the art will recognize that any suitable substrate may be used. However, this approach wastes space. For example, an imaging device comprised of an array of charge-coupled devices (CCD) or an array of CMOS sensors include some amount of space around the array for contact attachment pads used in the wire bonding method. Such placement forces the designer of the integrated chip and camera module to position the components around the extra space, thus taking up more space.

Other approaches used to provide an ultra-compact camera module having the ability to focus the manufactured parts utilizes a lens package with a barrel housing and a rotatable lens barrel. One approach utilizes a barrel housing having an internal thread surface and lens barrel having an external thread. According to this approach, the lens barrel is screwed into the barrel housing until the focal point of the lens package falls on the appropriate point. In another approach, the barrel housing has a ramp design and the lens barrel is rotated within the barrel housing which causes the lens barrel to move up the ramp. This movement adjusts the lens barrel in order to obtain the appropriate focal point.

However, these solutions cannot be applied to applications having angularly position-sensitive components. For instance, applications utilizing an array of charge-coupled devices (CCD) or CMOS sensors as the imaging device often times require that the imaging device and the actuator assembly be precisely aligned prior to adjusting focal point to account for the differences noted above. In this case, the precise alignment will be compromised by rotating the lens barrel to adjust the focal point.

Some camera module manufacturers have utilized resilient structures to adjust the focal point of a lens package. According to one method, a lens barrel is placed within a barrel housing which includes a resilient structure such as cushion or springs. The lens barrel is moved up or down to adjust the focal point of the system. As such the resilient structures either compress or expand based on the position of the lens barrel. This method presents a number of problems. First, once the focal point of the system is found, the pressure applied to the resilient structure must be maintained at a constant while the lens barrel is locked in place. Next, the pressure applied to the structures is often achieved by screwing the lens barrel into the housing barrel. Again, this causes unwanted rotation of the lenses in relation to the imaging device. Other methods of using resilient structure lack reliability due to creep damage and fatigue effects that occur to the resilient material, which, over time decreases the reliability of the camera.

What is needed is a method to effectively adjust the focal point of camera modules while maintaining an ultra-compact envelope, precise alignment of the lens package in relation to the imaging device and reliability of the integrity of the adjusted parts.

SUMMARY OF THE INVENTION

The present invention relates to methods of manufacturing an ultra-compact camera modules, adjusting them post production to precise focal point settings and sealing the precisely aligned assembly to maintain the focal point. Also, the invention specifically relates to ultra-compact camera module apparatuses.

In some embodiments of the present invention, the method of manufacturing an ultra-compact camera module includes manufacturing parts, aligning the parts, adjusting the focal point of a lens package and sealing the part to achieve reliability.

In some embodiments of the present invention, a ramp bridge is used to adjust the focal point of the lens package without rotating an actuator assembly in relation to a barrel housing. In other embodiments, a fixture is used to secure an actuator assembly in order to adjust the focal point.

In some embodiments of the present invention, a substrate and an imaging device are coupled to the ultra-compact camera module. In some embodiments of the present invention, a substrate cavity is formed in the substrate and the imaging device is coupled to the substrate using a flip-chip packaging approach.

In some embodiments of the present invention, the approach of coupling an imaging device using flip-chip packaging to a substrate opens up room on the top of the surface and the method of manufacturing and adjusting the assembly pieces in an ultra-compact camera module produce synergistic results when both novel methods are practiced together.

DETAILED DESCRIPTION OF THE INVENTION

The present invention relates to methods and apparatuses which are able to precisely manufacture, adjust and maintain accurate focal point settings in an ultra-compact camera module. Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Figure 1A:
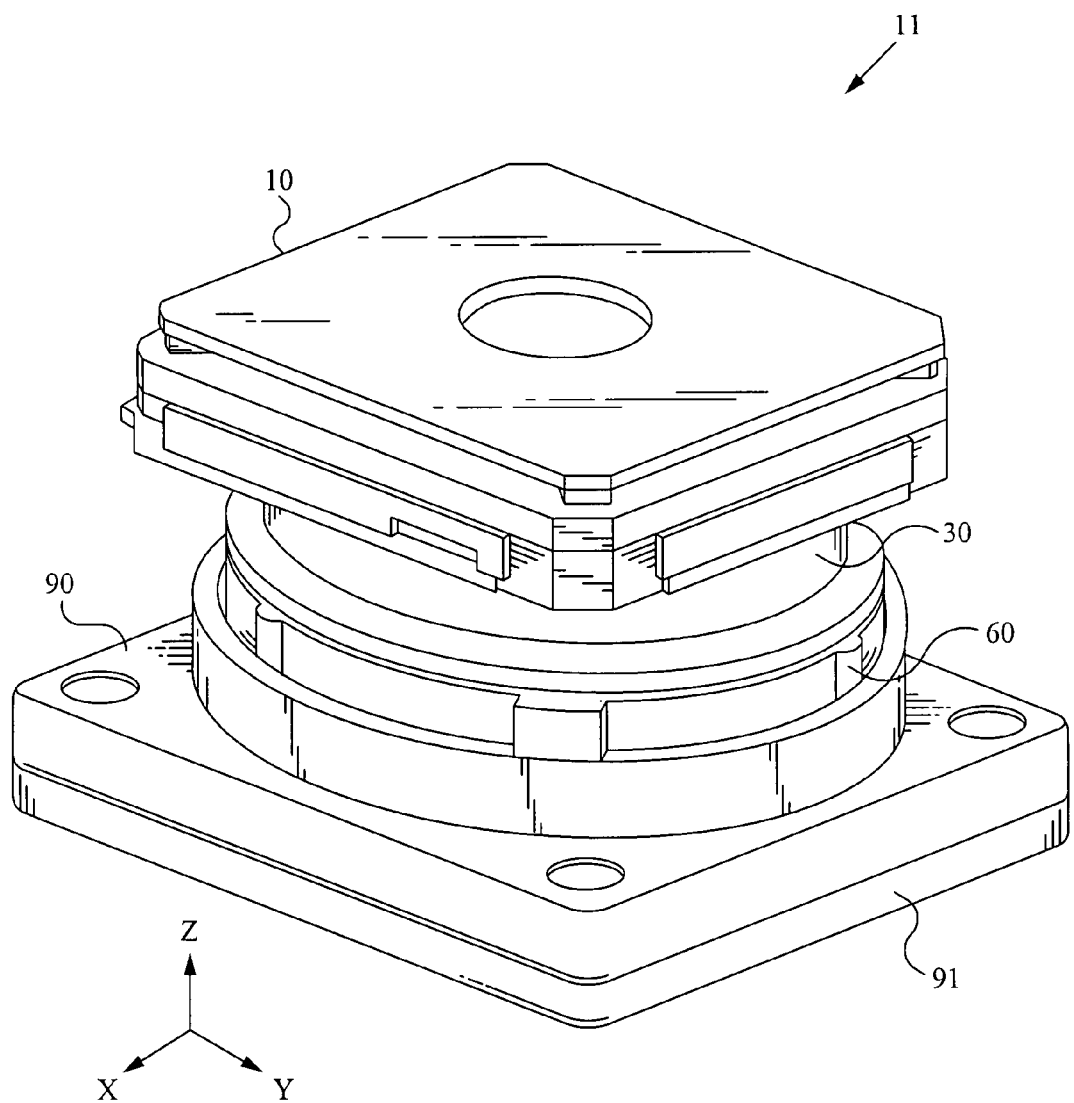
FIG. 1A illustrates a basic isometric view of the ultra-compact camera module according to some embodiments of the present invention.

FIG. 1A illustrates an isometric schematic view of the basic components of the ultra-compact camera module according to some embodiments of the present invention. As shown, the ultra-compact camera module 11 includes: an actuator assembly 10, a lens barrel 30, a ramp bridge 60, a barrel housing 90, a substrate 91, a substrate cavity (not shown) formed in the bottom surface of the substrate 91 and an imaging device (not shown).

Figure 1B:
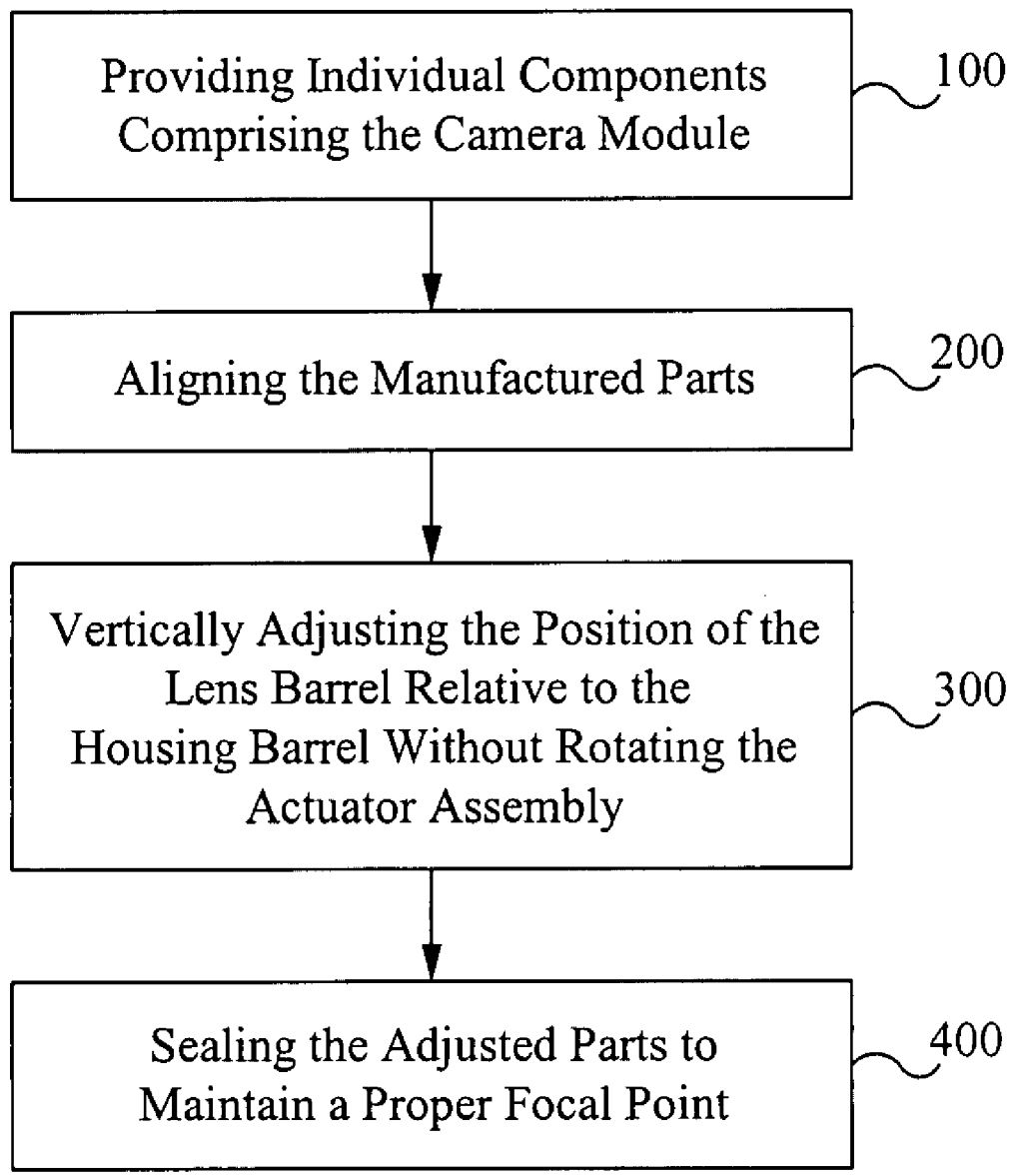
FIG. 1B illustrates the process steps involved in the method of manufacturing, adjusting and maintaining accurate focal point settings in an ultra-compact camera module.

FIG. 1B illustrates the process steps involved in the method of providing an ultra-compact camera module. Although the description of the process includes reference to the component parts mentioned in the discussion of FIG. 1A, it will be clear to those having ordinary skill in the art, that the general process is able to be carried out using substitute, or in some cases, different parts, as described elsewhere in the disclosure or as known by those having ordinary skill in the relevant art.

The process can be described as follows: the step 100 involves providing individual components comprising the camera module 100; the step 200 involves aligning the manufactured parts 200; the step 300 involves vertically adjusting the position of the lens barrel 30 relative to the barrel housing 90 without rotating the actuator assembly 10; and the step 400 involves sealing the adjusted parts to maintain a proper focal point.

In some embodiments of the present invention, the step 300, which involves vertically adjusting the position of the lens barrel 30 relative to the barrel housing 90 without rotating the actuator assembly 10 is accomplished by rotating the ramp bridge 60 on ramps (not shown) within the barrel housing 90 while the lens barrel 30 is fixed to the barrel housing 90 by locking keys (explained below) such that the ramp bridge 60 exerts a vertical force on the lens barrel 30 while the locking keys resists the rotational force.

In some embodiments of the present invention, the step 100 includes manufacturing assembly pieces as well as providing individual components comprising the ultra-compact camera module. In other embodiments, the step 100 of providing individual components comprising the ultra-compact camera module further includes manufacturing a substrate assembly for holding a sensor comprising an imaging device (explained below). In some embodiments of the present invention, the method comprises manufacturing an imaging device suitable for miniature camera applications. In yet other embodiments of the present invention, the step 100 of providing individual components comprising the ultra-compact camera module further includes providing a fixture (not shown), instead of the ramp bridge 60, wherein the fixture used to secure the actuator assembly 10 in place while the lens barrel rotates (explained below).

Figure 1C:
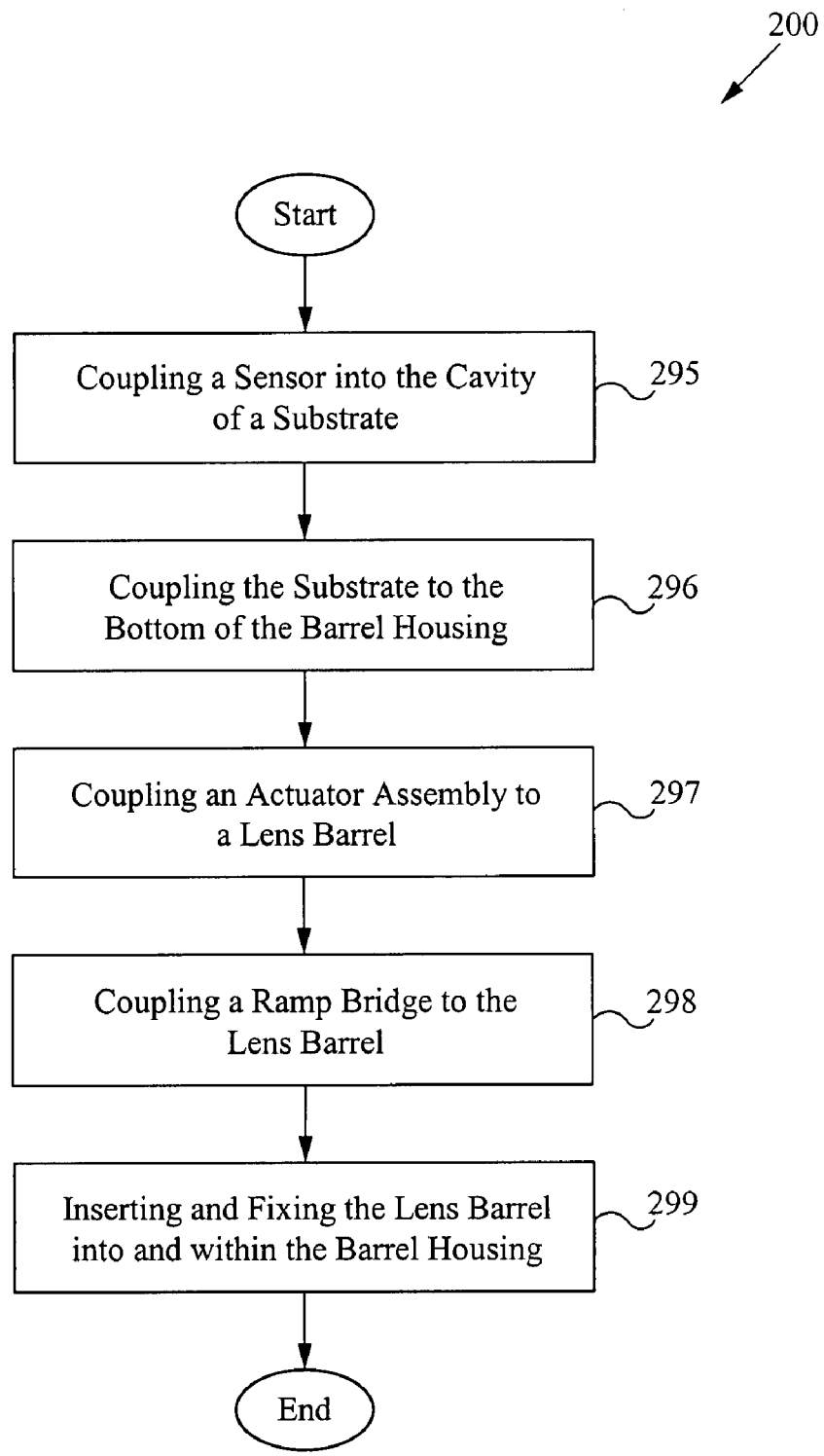
FIG. 1C illustrates the process steps involved in aligning the components according to some embodiments of the present invention

Once all the necessary parts are selected for a chosen camera module manufacture, the step of aligning the components 200 is performed. FIG. 1C illustrates the process steps involved in aligning the components 200 according to some embodiments of the present invention. The process includes: the step 295 of attaching a sensor into the substrate cavity; the step 296 of coupling the substrate to the bottom of a barrel housing; the step 297 of coupling an actuator assembly to a lens barrel; the step 298 of coupling a ramp bridge to the lens barrel; and the step 299 of inserting and fixing the lens barrel into and within the barrel housing. In the preferred embodiment, step 295, the step of coupling a sensor into the substrate cavity, is performed using the novel flip-chip approach of the present invention (explained below).

Referring again to FIG. 1B, once the parts are aligned, the step 300 of vertically adjusting the position of the lens barrel 30 relative to the barrel housing 90 without rotating the actuator assembly 10, is performed. The lens barrel 30 is adjusted relative to the imaging device such that the focal point of the lens package (not shown) falls incident, at least substantially, on the imaging device.

In some embodiments which utilize a ramp bridge 60, the ramp bridge 60 is rotated using a specially designed focus testing fixture tool (not shown). Using such a tool allows camera modules to be adjusted quickly, and in a factory line setting. In alternate embodiments, the ramp bridge 60 is rotated by any manual means, including hand rotation.

In alternative embodiments of the present invention, the ramp bridge 60 is omitted from the module assembly, and the lens barrel 30 is adjusted by rotating the lens barrel 30 itself while the actuator assembly 10 is held fixed by a fixture (explained below). In some embodiments of the present invention, the lens barrel 30 is rotated with a specially designed focus testing fixture tool. In other embodiments, the lens barrel 30 is rotated by any means, including hand rotation.

Figure 1D:
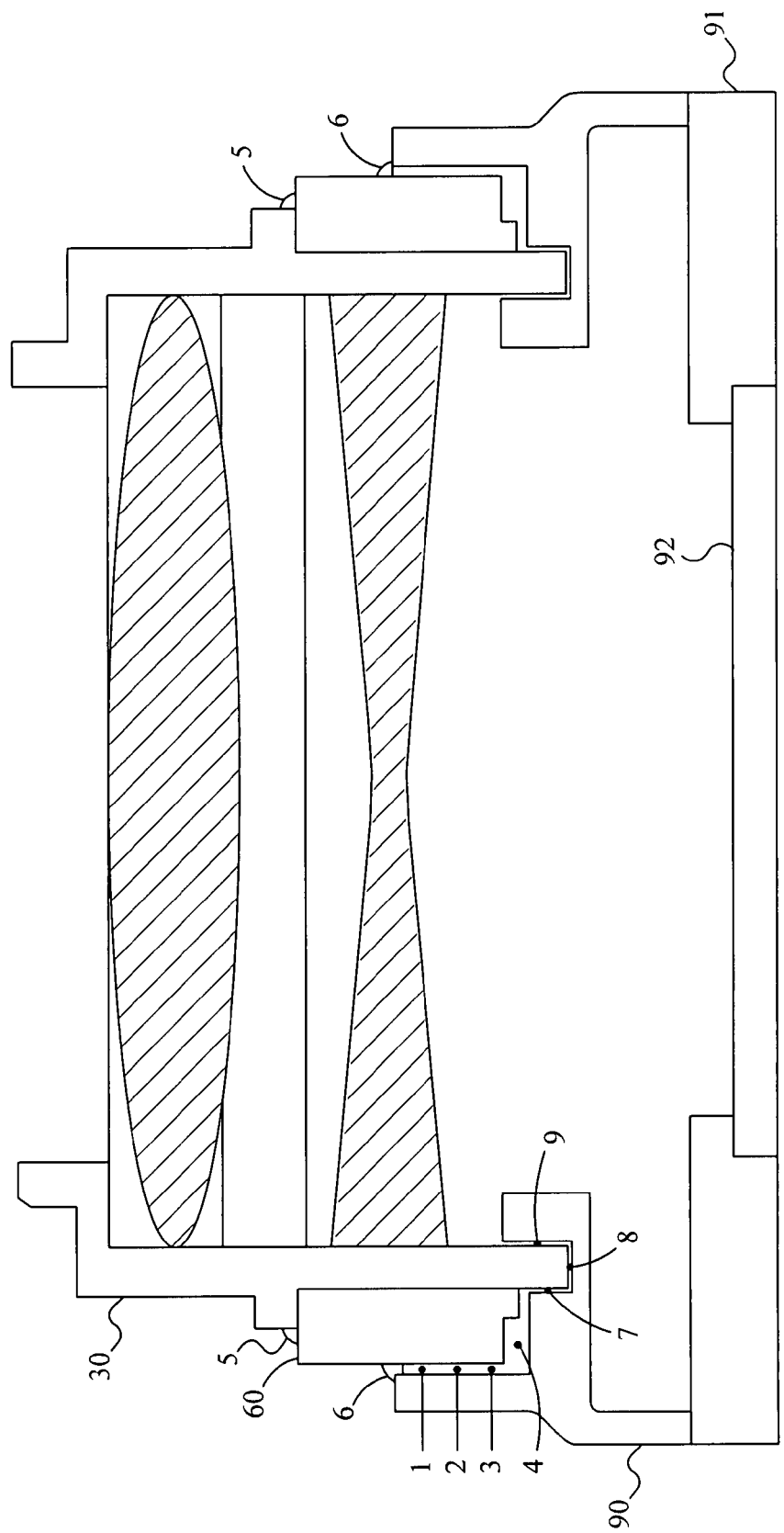
FIG. 1D illustrates a cross-section view of one embodiment of the ultra-compact camera module according to some embodiment of the present invention.

Once the lens barrel 30 is adjusted to the proper focal point, the step of sealing the adjusted parts to maintain a proper focal point 400 is performed. FIG. 1D illustrates a side schematic view of the locations of sealing according to some embodiments of the present invention. Shown is the barrel housing 90, ramp bridge 60, lens barrel 30, substrate 91 and imaging device 92. In some embodiments of the present invention, an adhesive (not shown) is injected in locations where the parts interface prior to assembly and focusing. According to these embodiments, the components are focused and maintained in a focused position as the adhesive cures. In some embodiments, a thermocompression process is used to seal the parts. In some embodiments, a thermosonic process is used to seal the parts. In some embodiments, the adhesive is a thermal cure epoxy. In yet other embodiments, ultra-violet curing epoxy tags are used to hold the components in place while the adhesive cures.

In the preferred embodiment of the present invention, a thermal cure epoxy is inserted on the surfaces where the parts interface. Specifically, the thermal cure epoxy is inserted at points 1, 2, 3 and 4. Next, the lens barrel 30 is inserted into the barrel housing 90 and is focused. Once properly focused, a set of ultra-violet curing epoxy tags 5, 6 are used at a number of points where the lens barrel 30 and barrel housing 90 meet. Ultra-violet light is used to cure the epoxy tags such that the tags hold the components in place during the thermal curing process. Next, the focused and tagged components are subjected to heat in order to cure the thermal cure epoxy. By using the epoxy tags, heat from the process of curing the thermal cure epoxy does not cause movement between lens barrel 30 and the barrel housing 90 as might normally occur due to normal effects of heat on the materials used in typical camera module applications.

Also shown in FIG. 1D is a particle trap comprising the areas 7, 8 and 9. The particle trap ensures that loose debris (not shown) present on the assembly pieces or found between the assembly pieces become trapped in area 8 and do not pass through area 9 onto the recording surface 92.

Figure 2:
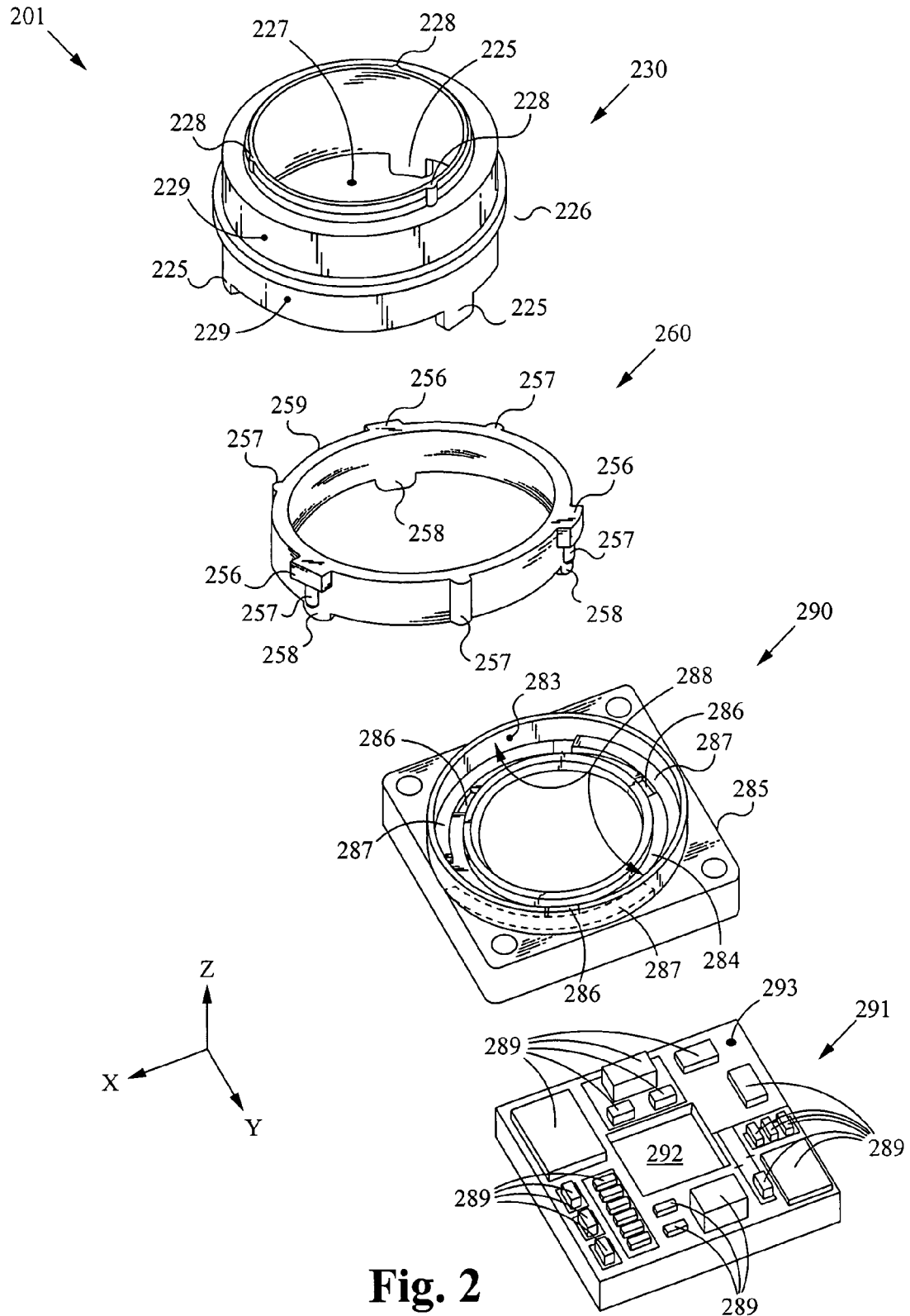
FIG. 2 illustrates an exploded isometric schematic view of an ultra-compact camera module with a ramp bridge according to some embodiments of the present invention.

FIG. 2 illustrates a detailed, exploded perspective schematic view of an ultra-compact camera module 201 with a lens barrel 230, a ramp bridge 260, a barrel housing 290 and substrate surface 291 according to some embodiments of the present invention. For ease of description, a number of components are purposefully omitted such as lenses and electrical couplings.

The substrate 291 comprises a substrate surface 293 and an aperture 292 passing through the substrate surface 293. In some embodiments of the present invention, an imaging device (not shown) is located within the aperture 292. In some embodiments of the present invention, electronic components 289 are disposed on the substrate surface 293 and are used to control various functions associated with the ultra-compact camera module including, auto focusing functions, among others. Preferably, the imaging device (not shown) is physically and electronically coupled to the substrate 291 with the flip-chip process according to the present invention (explained below).

The barrel housing 290 comprises a cylindrical surface 283, a cylindrical volume 288, ramps 287, slots 286 and a housing base 285. In some embodiments of the present invention, the housing base 285 includes a barrel housing cavity (not shown) on the under-side of the housing base 285. According to these embodiments, the barrel housing cavity (not shown) accommodates the electronic components 289 when the barrel housing 290 is coupled to the substrate 291.

The ramp bridge 260 comprises a ring 259, ramp feet 258, and barrel housing alignment ribs 257. The ring 259 fits within the cylindrical volume 288 of the barrel housing 290. When the ring 259 is positioned within the cylindrical volume 288, the ramp feet 258 rest on the ramps 287 and the barrel housing alignment ribs 257 make contact with the inside surface of the cylindrical surface 283. As such, the vertical position of the ramp bridge 260 is adjusted as the ramp bridge 260 is rotated up or down the ramps 287 within the barrel housing 290. In some embodiments of the present invention, a number of tabs 256 are disposed on the ring 259. The tabs 256 are provided to allow a tool (not shown) to grab onto the ring 259 and turn the ring 259 in a factory line setting.

The lens barrel 230 comprises a continuous cylindrical surface 229 with a stand-off ridge 226 separating the top portion of the cylindrical surface 229 and the bottom portion of the cylindrical surface 229. The lens barrel 230 further comprises: actuator housing alignment ribs 228, a lens barrel cavity 227 and locking keys 225. The bottom portion of the cylindrical surface 229 is positioned within the ring 259 and the stand-off ridge 226 prevents the ring 259 from being pushed over the top portion of the cylindrical surface 229 when an upward force is exerted on the ring 259, thus moving the lens barrel 230 in the Z-direction without rotating the lens barrel 230 relative to the substrate surface 291. When the lens barrel 230 is positioned within the ramp bridge 260, the ramp bridge 260 is able to freely rotate about the bottom portion of the cylindrical surface 229. When the lens barrel 230 and the ramp bridge 260 are coupled as such, and the ramp bridge 260 is positioned within the barrel housing 290, the locking keys 225 fit within the slots 286 while the ramp feet 258 rest on the ramps 287. The locking keys 225 are designed to be longer than necessary to fit within the slots 286 such that the lens barrel 230 is able to be moved in the Z-direction while the locking keys 225 maintain their position within the slots 286. When coupled in this fashion, the lens barrel 230 is forced vertically upward, without being rotated itself, as the ramp bridge 260 rotates and moves up ramps 287.

When the assembly pieces are assembled, an actuator assembly (not shown) is optionally coupled to the top of the lens barrel 230 and an imaging device (not shown) is positioned below the cylindrical volume 288. In some embodiments of the present invention, the actuator assembly (not shown) and the lens barrel 230 are fitted with lenses (not shown) comprising a lens package (not shown), wherein the lens package has a given focal point (not indicated). The vertical height of lens package is able to be adjusted relative to the imaging device by rotating the ramp bridge 260, causing the ramp feet 258 to move up and down the ramps 287 forcing the ramp bridge 260 up in the Z-direction without rotating the lens barrel 230 or the actuator assembly (not shown). As such, the focal point of the lens package is adjusted to be incident on the imaging device.

Figure 3:
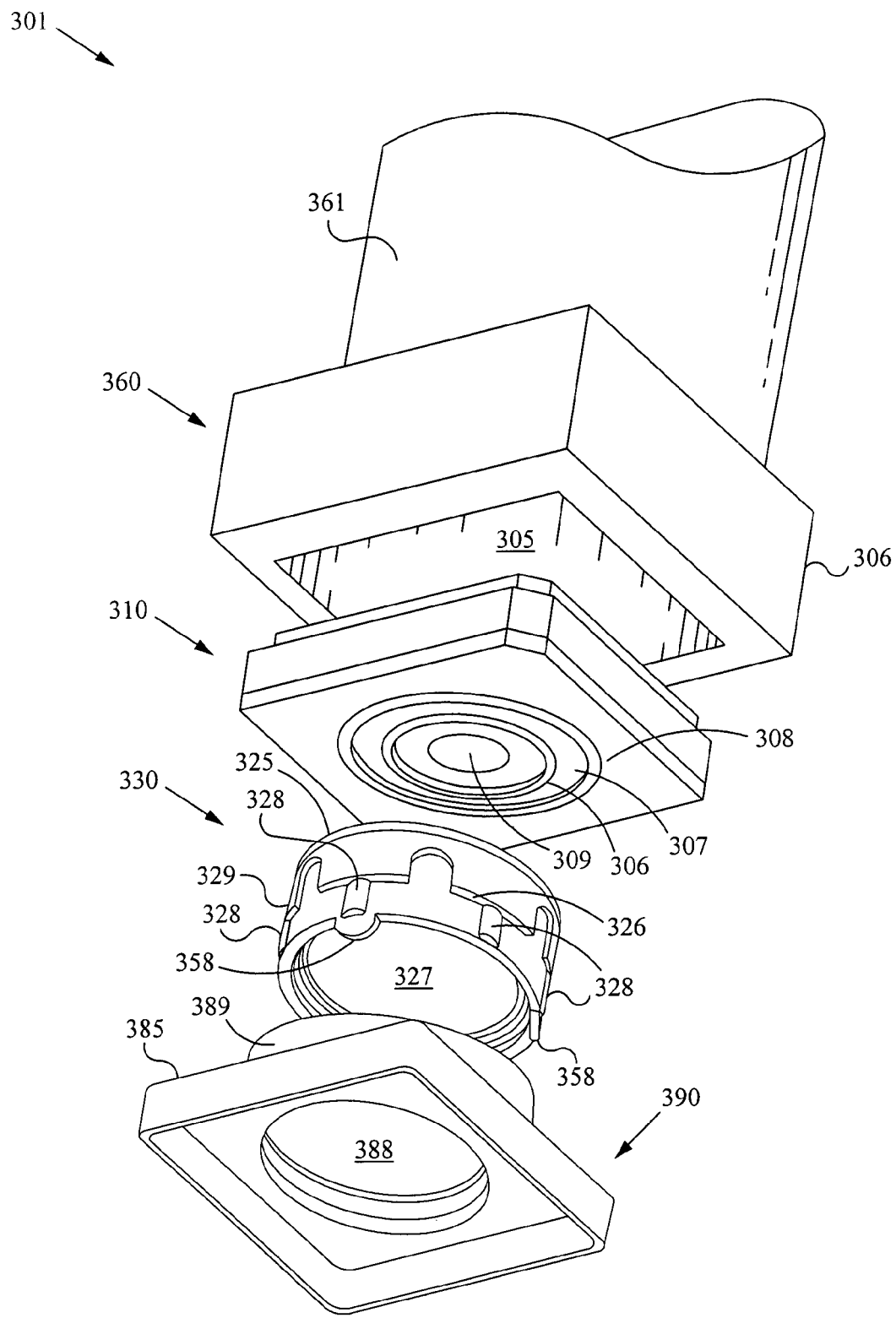
FIG. 3 illustrates an exploded isometric schematic view of an ultra-compact camera module using a fixture according to some embodiments of the present invention.

FIG. 3 illustrates an exploded isometric schematic view of an ultra-compact camera module 301 according to some embodiments of the present invention. The module 301 illustrated in FIG. 3 provides an alternate method of moving the lens barrel 330 vertically without rotating the lens barrel 330 in relation to an imaging device (not shown) by utilizing a fixture 361 rather than the ramp bridge 260 of FIG. 2. The camera module 301 comprises a barrel housing 390, a lens barrel 330, an actuator assembly 310 and a vertical adjustment fixture 360. The barrel housing 390 comprises a cylindrical surface 389, a barrel cavity 388, ramps (not shown), and a housing base 385. The lens barrel 330 comprises a cylindrical surface 329, actuator housing alignment ribs 328, a lens barrel cavity 327 and ramp feet 358. In some embodiments of the present invention, a stand-off lip 326 is provided to allow a tool (not shown) to grab onto the lens barrel 330 and rotate it in a factory line setting. The bottom of the cylindrical surface 329 is positioned within the barrel housing 390. When fully inserted into the barrel housing 390, the ramp feet 358 of the lens barrel 330 make contact with the ramps (not shown) such that the ramp feet 358 travel up the ramps (not shown) as the lens barrel is rotated within the barrel housing 390. During rotation, the lens barrel alignment ribs 328 make contact with the inside surface of cylindrical surface 389.

The actuator assembly 310 comprises a conduit 309 for allowing light to pass through the actuator assembly 310 and other optical components (not shown) and lens (not shown) used for image capture. Furthermore, the bottom of the actuator assembly 310 comprises ridges 308 and 306 which define a channel 307. The channel 307 is configured such that the cylindrical ridge 325 fits within the channel 307. As such, the actuator assembly 310 is coupled to the top of the lens barrel 330.

The vertical adjustment fixture 360 comprises a shell 306 and a cavity 305. The cavity 305 is comprised to fit over the actuator assembly 310 such that the actuator assembly 310 cannot rotate within the cavity 305. In some embodiments of the present invention, the fixture 360 couples with an arm 361. According to these embodiments, the arm 361 is coupled to a machine (not shown) used to automatically adjust camera module focal points in a factory line setting.

It is another object of the present invention to decrease the size of the module by providing a new method of attaching an imaging device to a substrate which contains other electronic components necessary for camera applications including auto-focusing and shuttering, among others. The traditional method of coupling the imaging device to a substrate comprises coupling an imaging device onto the top of a substrate using traditional wire bonding techniques. However, this technique wastes space because the contact attachment pads for wire bonding force chip designers to spread out the components on the substrate surface to provide the necessary room to attach the inputs of the imaging device to contact attachment pads. Therefore, it is an object of the present invention to utilize a flip-chip approach to couple the imaging device to the substrate in order to decrease the amount of space on the top surface of the substrate dedicated to the imaging device.

Figure 4A:
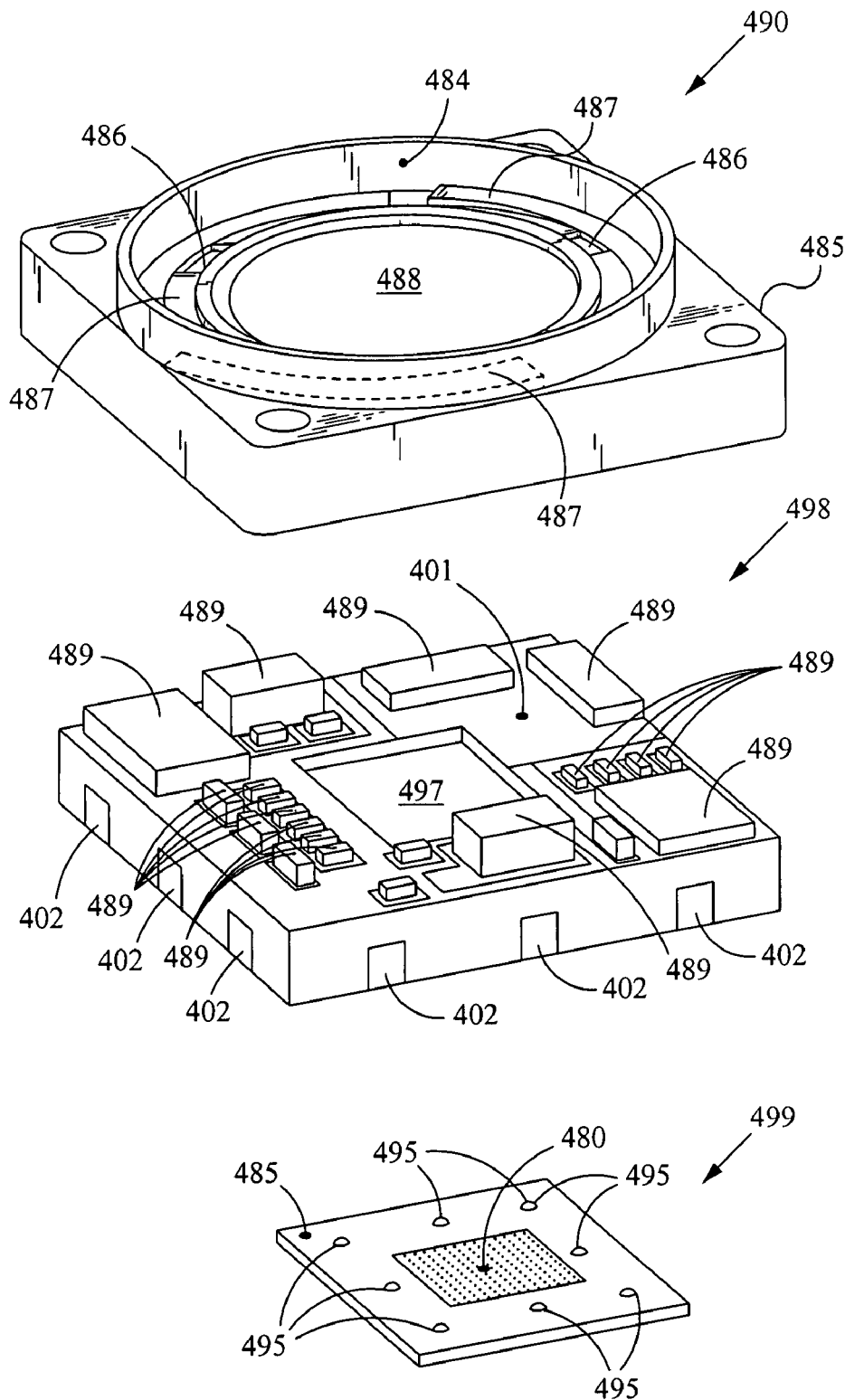
FIG. 4A illustrates an isometric semi-exploded schematic view of a barrel housing, a substrate and an imaging device according to some embodiments of the present invention.

FIG. 4A illustrates an isometric semi-exploded schematic view of an imaging device 499, a substrate assembly 498 and a barrel housing 490. The substrate assembly 498 comprises a substrate surface 401 and is configured with a cavity (not shown) on the underside of the substrate surface 401. An aperture 497 passes through the substrate surface 401. Furthermore, a number of electrical components 489 are coupled to the substrate surface 401.

Furthermore, the substrate assembly 498 includes a number of contact attachment pads 402. The contact attachment pads 402 are located on the side surface of the substrate assembly 498 and also on the bottom surface of the substrate assembly (not shown in FIG. 4A). The contact attachment pads 402 electronically couples the imaging device 499 and the electronic components 489 with external electronic devices. In some embodiments of the present invention, the placement of the contact attachment pads 402 allows the miniature camera module to be used in a number of generic camera applications. In other embodiments, the contact attachment pads 402 are specifically designed for a particular application.

The imaging device 499 comprises an imaging surface (indicated with a dot pattern) and a connection surface 485. The imaging surface 480 is the part of the imaging device 499 which actually receives and begins to processes image data. In some embodiments of the present invention, the imaging surface 480 comprises an array of CCDs. In other embodiments of the present invention, the imaging surface 480 comprises an array of CMOS sensors. In general, the imaging surface 480 can comprise any conventional sensor for collecting light. The connection surface 485 of the imaging device comprises a bonding area configured to bond with a substrate and configured to provide a means for electrical communication between the inputs and outputs (not shown) of the imaging device 499 and the components 489 of the substrate. Preferably, the imaging device 499 is coupled to the substrate assembly 498 with conductive bumps 495 using flip-chip packaging techniques. However, the flip-chip connection of the present invention differs slightly from traditional flip-chip packaging, in that the conductive bumps used for coupling are located on the same side as the imaging surface 480 and are coupled to the substrate assembly 498 through the bottom of the substrate assembly 498. The conductive bumps 495 are used as the means for electrical communication between the inputs and outputs (not shown) of the imaging device 499 and the components 489 on the substrate surface 401.

The aperture 497 of the substrate assembly 498 are configured such that the imaging surface 480 of the imaging device 499 is exposed through the aperture 497 and the connection surface 485 is substantially concealed when coupled. As such, the amount of space on the top of the substrate surface 401 available for components 489 is not affected by the size of the connection surface 485 of the imaging device 499, and therefore can be maximized. This allows the size of the substrate assembly 498 to be smaller, and in turn allows the size of the module (not shown) to be smaller.

The housing 490 comprises a cylindrical surface 484, a barrel cavity 488, ramps 487, slots 486 and a housing base 485. The housing base 485 is configured to be coupled to the top of the substrate 498 and further comprises a cavity (not shown) for containing the components 489.

Figure 4B:
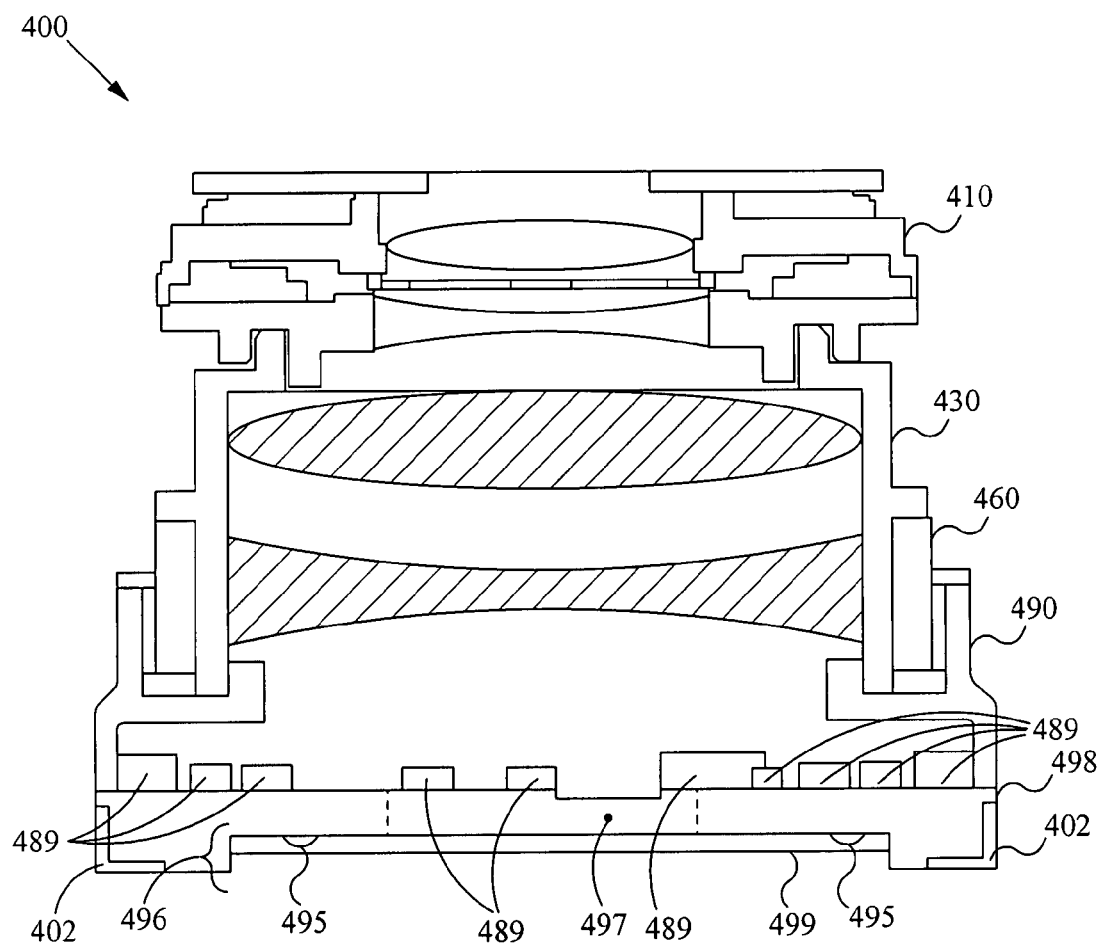
FIG. 4B illustrates a side cross-section schematic view of the of an ultra-compact camera module utilizing flip-chip coupling according to some embodiments of the present invention.

FIG. 4B illustrates a side schematic cross-section view of the of an ultra-compact camera module 400 utilizing flip-chip coupling according to some embodiments of the present invention. As shown, an actuator assembly 410 is coupled to a lens barrel 430, and the lens barrel 430 is further coupled to a barrel housing 490. In some embodiments of the present invention, the lens barrel 430 is movable without causing rotation of the actuator assembly 410 by rotating a ramp bridge 460 (explained above). In alternative embodiments of the present invention, the lens barrel 430 is movable by holding the actuator assembly 410 with a fixture and rotating the lens barrel 430 (explained above).

Furthermore, a imaging device 499 is coupled to the bottom of a substrate 498. The substrate 498 is configured with a substrate cavity 496 and an aperture 497 passing therethrough. Preferably, the substrate cavity 496 is configured such that imaging device 499 is completely housed vertically within the substrate cavity 496. Furthermore, a number of electrical components 489 are coupled to the substrate 498.

The imaging device 499 is bonded to the substrate assembly 498 via conductive bumps 495. The conductive bumps 495 are configured to couple the imaging device 499 to the substrate assembly 498 and also to provide a means for electrical communication between the inputs and outputs (not shown) of the imaging surface (not shown) and the components 489. In some embodiments of the present invention, the imaging device 499 is bonded to the substrate assembly 498 in a thermocompression reaction by applying heat and pressure. In other embodiments, the imaging device 499 is bonded to the substrate assembly 498 by using thermosonic joining. In yet other embodiments, the imaging device 499 is bonded to the substrate assembly 498 by conductive adhesive bonding. In general, any bonding technique can be used to bond the imaging device 499 to the substrate assembly 498.

In some embodiments of the present invention, a number of contact attachment pads 402 are included to electronically couple the imaging device 499 and the electronic components 489 with other electronics in a camera mechanism. In some embodiments, the contact attachment pads are integrally formed as part of the substrate assembly 498. In other embodiments, the contact attachment pads 402 are coupled to the bottom and sides of the substrate assembly 498. As such, the ultra-compact camera module 400 is easily able to be electrically coupled with other electronic devices such as cellular telephones and PDA devices, among other devices for ultra-compact camera applications.

The method of bonding the imaging device 499 to the substrate assembly 498 using flip-chip techniques achieves an object of the present invention: to reduce the size of the camera module. As explained above, other objects of the present invention include the ability to focus the lens package of the module 400 without rotating the actuator assembly 410 in relation to the imaging device 499.

The present application has been described in terms of specific embodiments incorporating details to facilitate the understanding of the principles of construction and operation of the power amplification circuit. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An ultra-compact camera comprising:
   a. a barrel housing comprising:
      i. a housing base with a top surface and a bottom surface;
      ii. a cylindrical barrel disposed on the top surface of the housing base, wherein an internal surface is composed of a portion of the top surface located within the cylindrical barrel;
      iii. at least one ramp disposed on the internal top surface, wherein the at least one ramp has a vertically increasing gradient; and
      iv. at least one locking key slot disposed on the internal top surface;
   b. a lens barrel assembly comprising:
      i. a cylinder section having a top cylinder, a bottom cylinder and a stand-off ridge positioned between the top cylinder and the bottom cylinder;
      ii. at least one locking key protrusion extending downward, away from the bottom cylinder; and
      iii. a first portion of a lens package included within the cylinder section;
   c. a ramp bridge comprising:
      i. a ring having a ring top and a ring bottom; and
      ii. at least one ramp foot on the bottom of the ring extending downward, away from the ring; and
   d. an actuator assembly, wherein the actuator assembly couples to the top cylinder, wherein the ramp bridge is positioned over the bottom cylinder, such that the ramp bridge is configured to exert a force on the stand-off ridge when a force is applied to the ring bottom, wherein the lens barrel is positioned within the cylindrical barrel such that the at least one locking key protrusion fits within the at least one locking key slot and the at least one ramp foot contacts the at least one ramp.

2. The ultra-compact camera according to claim 1, wherein the housing base further comprises:
   a. a barrel housing cavity disposed in the bottom surface; and
   b. a conduit in the housing base passing from the internal surface into the cavity.

3. The ultra-compact camera according to claim 2, further comprising
   a. a substrate coupled to the bottom surface, the substrate comprising:
      i. a substrate top, wherein electronic components are disposed on the substrate top, and wherein the electronic components fit entirely within the cavity;
      ii. a substrate bottom, wherein a chamber is disposed in the substrate bottom;
      iii. an aperture passing through the substrate; and
      iv. a imaging device positioned within the chamber, wherein the imaging device is coupled to the substrate using a flip-chip packaging technique, such that the imaging device is in electric communication with the electronic components, and wherein light is able to pass from the actuator assembly, through the lens barrel, through the conduit of the barrel housing, through the aperture of the substrate and to impinge on the imaging device.

4. The ultra-compact camera according to claim 2, wherein the imaging device is an array of charge-coupled devices.

5. The ultra-compact camera according to claim 2, wherein the imaging device is an array of CMOS sensors.

6. An ultra-compact camera comprising:
   a. a barrel housing comprising:
      i. a housing base with a top surface and a bottom surface;
      ii. a cylindrical barrel disposed on the top surface of the housing base, defining a cylindrical volume with a floor;
      iii. at least one ramp disposed on the floor, wherein the at least one ramp has a vertically increasing gradient; and
   b. a lens barrel assembly comprising:
      i. a cylinder section;
      ii. a first portion of a lens package included within the cylinder section; and
      iii. at least one lens barrel foot on the bottom of the cylinder section extending downward, away from the cylinder section, wherein the lens barrel assembly fits within the cylindrical volume such that at least one lens barrel foot makes contact with the at least one ramp, and wherein the at least one lens barrel foots moves up the at least one ramp when the lens barrel assembly rotates within the barrel housing;

c. an actuator assembly, wherein the actuator assembly couples to the lens barrel assembly, wherein the lens barrel assembly is configured to exert a force on the actuator assembly when the at least one lens barrel foots moves up the at least one ramp, and wherein the force has a vertical component and a rotational component; and d. a fixture, comprising a chamber designed to contain the actuator assembly, such that when the lens barrel exerts the force on the actuator assembly, the fixture resists the rotational component and provides no resistance to the vertical component.

7. The ultra-compact camera according to claim 6, wherein the housing base further comprises:

a. a barrel housing cavity disposed in the bottom surface; and b. a conduit in the housing base passing from the internal surface into the cavity.

8. The ultra-compact camera according to claim 7, further comprising a. a substrate coupled to the bottom surface, the substrate comprising:
   i. a substrate top, wherein electronic components are disposed on the substrate top, and wherein the electronic components fit entirely within the cavity;
   ii. a substrate bottom, wherein a chamber is disposed in the substrate bottom;
   iii. an aperture passing through the substrate; and
   iv. a imaging device positioned within the chamber, wherein the imaging device is coupled to the substrate using a flip-chip packaging technique, such that the imaging device is in electric communication with the electronic components, and wherein light is able to pass from the actuator assembly, through the lens barrel, through the conduit of the barrel housing, through the aperture of the substrate and finally is able to fall incident on the imaging device.

9. An ultra-compact camera comprising:

a. a barrel housing comprising:
   i. a housing base with a top surface and a bottom surface;
   ii. a cylindrical barrel disposed on the top surface of the housing base, defining a cylindrical volume with a floor
   iii. at least one ramp disposed on the floor, wherein the at least one ramp has a vertically increasing gradient; and
   iv. at least one locking key slot disposed on the floor;

b. a lens barrel assembly comprising:
   i. a continuous cylinder section having a stand-off ridge positioned between a top portion of the cylinder and the bottom portion of the cylinder;
   ii. at least one locking key protrusion disposed on the bottom portion of the cylinder extending downward, away from the bottom portion of the cylinder; and
   iii. a first portion of a lens package contained within the cylinder section;

c. a ramp bridge comprising:
   i. a ring having a ring top and a ring bottom; and
   ii. at least one ramp foot on the bottom of the ring extending downward, away from the ring, wherein the ramp bridge is positioned over the bottom portion of the cylinder, such that the ramp bridge exerts a force on the stand-off ridge when a vertical force is applied to the ring bottom, wherein the lens barrel is positioned within the cylindrical barrel such that the at least one locking key protrusions fits within the at least one locking key slot and the at least one ramp foot contacts the at least one ramp.

10. The ultra-compact camera according to claim 9, the housing base further comprising a. a barrel housing cavity disposed in the bottom surface; and b. a conduit in the housing base passing from the internal surface into the cavity.

11. The ultra-compact camera according to claim 10, further comprising a. a substrate coupled to the bottom surface, the substrate comprising:
   i. a substrate top, wherein electronic components are disposed on a substrate top, and wherein the electronic components fit entirely within the cavity;
   ii. a substrate bottom, wherein a chamber is disposed in substrate bottom;
   iii. an aperture passing through the substrate; and
   iv. a imaging device positioned within the chamber, wherein the imaging device is coupled to the substrate using a flip-chip packaging technique, such that the imaging device is in electric communication with the electronic components, and wherein light is able to pass from the lens barrel, through the conduit of the barrel housing, through the aperture of the substrate and finally is able to fall incident on the imaging device.

* * * * *

UNITED STATES PATENT AND TRADEMARK OFFICE
CERTIFICATE OF CORRECTION

PATENT NO. : 7,825,985 B2  Page 1 of 2
APPLICATION NO. : 11/980021
DATED : November 2, 2010
INVENTOR(S) : Westerweck et al.

It is certified that error appears in the above-identified patent and that said Letters Patent is hereby corrected as shown below:

At column 2, lines 57-60, please replace the phrase "manufacturing an ultra-compact camera modules" with "manufacturing ultra-compact camera modules" so that the corresponding sentence reads:
-- The present invention relates to methods of manufacturing ultra-compact camera modules, adjusting them post production to precise focal point settings and sealing the precisely aligned assembly to maintain the focal point. --

At column 4, lines 8-15, please replace the phrase "it will be clear to those having ordinary skill in the art, that the general process" with "it will be clear to those having ordinary skill in the art that the general process" so that the corresponding sentence reads:
-- Although the description of the process includes reference to the component parts mentioned in the discussion of FIG. 1A, it will be clear to those having ordinary skill in the art that the general process is able to be carried out using substitute, or in some cases, different parts, as described elsewhere in the disclosure or as known by those having ordinary skill in the relevant art. --

At column 4, lines 64-67, please replace the phrase "without rotating the actuator assembly 10, is performed" with ""without rotating the actuator assembly 10 is performed" so that the corresponding sentence reads:
-- Referring again to FIG. 1B, once the parts are aligned, the step 300 of vertically adjusting the position of the lens barrel 30 relative to the barrel housing 90 without rotating the actuator assembly 10 is performed. --

At column 8, lines 43-46, please replace the phrase "The aperture 497 of the substrate assembly 498 are configured" with "The aperture 497 of the substrate assembly 498 is configured" so that the corresponding sentence reads:
-- The aperture 497 of the substrate assembly 498 is configured such that the imaging surface 480 of the imaging device 499 is exposed through the aperture 497 and the connection surface 485 is substantially concealed when coupled. --

In Claim 6, at column 11, line 4, please replace the word "foots" with the word "foot" so that the line of the claim correctly reads:
-- ramp, and wherein the at least one lens barrel foot --

Signed and Sealed this

Twenty-first Day of December, 2010

David J. Kappos
*Director of the United States Patent and Trademark Office*

In Claim 6, at column 11, line 10, please replace the word "foots" with the word "foot" so that the line of the claim correctly reads:
-- actuator assembly when the at least one lens barrel foot --

In Claim 9, at column 11, lines 49-51, please insert a -- ; -- after the word "floor" so that the claim limitation correctly reads:
-- ii. a cylindrical barrel disposed on the top surface of the housing base, defining a cylindrical volume with a floor; --

In Claim 11, at column 12, lines 39-40, please insert the word "the" between the words "in" and "substrate" so that the claim limitation correctly reads:
-- ii. a substrate bottom, wherein a chamber is disposed in the substrate bottom; --